Nov. 4, 1947.  R. C. WALDRON ET AL  2,430,378
REVERSED LAY CABLE
Filed July 9, 1945
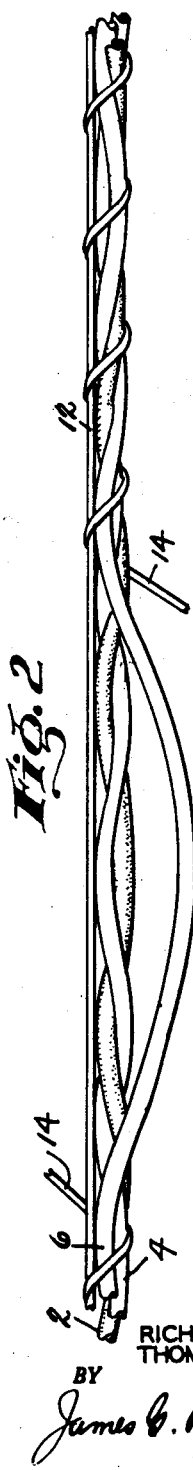
INVENTORS
RICHARD C. WALDRON
THOMAS L. HALL
BY
ATTORNEY Patented Nov. 4, 1947

2,430,378

UNITED STATES PATENT OFFICE 2,430,378

REVERSED LAY CABLE

Richard C. Waldron, Clifton, and Thomas L. Hall, Upper Montclair, N. J., assignors to The Okonite Company, Passaic, N. J., a corporation of New Jersey Application July 9, 1945, Serial No. 603,846

3 Claims. (Cl. 174—41)

1

This invention relates to electric cables, and is particularly directed to electric cables comprising two or more insulated conductors twisted together.

Multi-conductor electric cables are made conventionally by twisting the individually insulated conductors together in the same direction throughout the length of the cable. Such construction is desirable in order to provide the necessary flexibility so that the cable can be wound on a reel for shipment, and so that the cable can be bent during installation.

It is often necessary to tap the conductors at intervals, and under such conditions it is very desirable that the cable be constructed in such a fashion that tap splices can be made without necessitating cutting of the conductor. With the cable conductors twisted together in the usual way, it will be appreciated that it is impossible to separate them, particularly in the case of a suspended cable, such as an aerial cable, without shortening the cable so as to obtain some slack. Even if slack can be obtained it is difficut to straighten the conductors inasmuch as the conductors must be twisted up tighter, at least at one side of the tap, in order to obtain a straight length for the tap.

The primary object of our invention is to provide a multi-conductor electric cable comprising a plurality of twisted together conductors, wherein the objectionable features above mentioned inherent in conventional multi-conductor electric cables are eliminated.

More specifically our invention provides a composite multi-conductor cable assembly comprising a sustaining tension element and a plurality of conductors, wherein the conductors are twisted together in a long pitch spiral first in one direction and then in the opposite direction for a portion of the cable length or throughout the entire cable length as desired. It will be appreciated that in such a construction the conductors can be readily separated for tapping or splicing at the section where the direction of twist is reversed and while the assembly is under longitudinal tension, without the necessity of tightening the twist at one side of this section in order to obtain some slack to permit of separation and tapping of the conductors. It will be appreciated also that sufficient separation of the conductors may readily be obtained to permit making the tap or splice with the conductors energized at or below the voltage level at which open wire construction is worked with rubber gloves and rubber protective equipment. Such procedure is impracticable with conventional multi-conductor cable.

Our invention will be understood more readily upon reference to the accompanying drawing wherein, Fig. 1 illustrates in elevation a short length of cable embodying our invention, and Fig. 2 illustrates the same cable with the conductors separated for tapping.

Referring to the drawing in detail, the cable illustrated comprises three electric conductors 2, 4 and 6. The number of conductors of course may be varied as desired. We have elected to show the conductors as individually insulated, but it is to be understood that the conductors may be uninsulated, or they may be insulated for only a portion of the cable length.

Reading the drawing from left to right, it will be seen that the conductors 2, 4 and 6 are twisted together in a long pitch spiral in one direction up to the point or section 8. The twist is then reversed in direction and continues in this reverse direction up to the point or section 10, where the twist is again reversed to its original direction. It is to be distinctly understood that it is within the purview of our invention to twist the conductors together throughout the length of the cable or for only a portion of the cable, just as may be found necessary or desirable.

It is to be understood also that the distance between twist reversals may be varied, and that the twist reversals may be at regular intervals or not.

In the cable illustrated we provide a sustaining tension element or messenger 12 which may be a solid or stranded wire. This messenger has been shown as laid straight along the cable to which it is bound by tape or wire 14 wrapped helically about the cable in one direction throughout the length of the cable. The messenger 12 in addition to functioning as a support for the cable may function as a conductor when desired. It is to be understood that this construction may be modified by wrapping wires about the twisted together conductors, or applying a braid about the conductor assembly, it being understood that in all cases the construction is to be such as to impart longitudinal strength to the cable. On the other hand the messenger 12 could be replaced by a tape and the assembly covered with any type of covering such as a rubber jacket, for example. It will be appreciated also that we may employ two tapes 14 instead of one as illustrated, these tapes being applied to the assembly in opposite directions.

It will readily be seen that where it is desired to tap one or more of the conductors of our improved cable, it is merely necessary to cut and unwrap the tape or wire 14 or other form of wrap or covering at the desired section or point where the conductor twist is reversed and for a short distance each side of this point or section, as illustrated in Fig. 2, whereupon the conductors may be untwisted giving ample slack for tapping.

As above pointed out the spacing of the twist reversals may be uniform or not just as desired, depending upon how frequently the cable is to be tapped, and the location of the taps.

The amount of separation obtained can readily be calculated:

Assumed length of a complete twist or length of lay of cable=L=18″
Assumed diameter of the individually insulated conductors=d=1″

Then if the binder tape or wire 14 is unwrapped for a distance of 18″ at each side of the point 8, for example, then we will have a conductor length on each side of point or section 8 of Length of conductor=

$$\sqrt{(\pi \times 1.16 d)^2 + L^2} = \sqrt{13.3 + 324.0} = 18.35''$$

or a total length of 37.7″, corresponding to an opening along the cable 36″ long. This increase in length will allow a conductor to be pulled out or away from its original location 3.64″, which gives ample room for splicing or tapping. If greater separation is desired obviously another turn may be untwisted corresponding to a total opening along the cable 72″ long, giving a total separation of 7.28″. Thus a separation may be obtained as large as may be desired simply by unwrapping more cable.

The cable can also be twisted with a shorter lay so as to obtain greater separation for the same length of opening. For example, assume the length of lay to be 12 inches instead of the 18 inches assumed in the above calculations, then, if the cable is again untwisted for a total distance of 72″, the conductors may be separated about 11″ instead of 7.28″.

It is to be understood that our invention is not confined to aerial cables, but is applicable to other types of multi-conductor cable. It is to be understood also that the number of conductors may be varied from that illustrated in the drawing. Other changes may be made in the details of construction and arrangement of parts, without departing from the spirit and scope of our invention.

What we claim is:

1. A composite electric cable assembly comprising, in any given length, a sustaining tension element of the same length as the said given length, a plurality of individually insulated conductors twisted together in a long pitch spiral and held to said sustaining tension element, said conductors being of substantially greater length than said sustaining tension element, the direction of twist of said conductors being reversed at intervals, the length of lay of each complete twist relative to the spacing of the twist reversals being such as to promote separation of the conductors from each other and from the sustaining tension element, for splicing or tapping, in the region of twist reversal, with the assembly under longitudinal tension.

2. A composite electric cable assembly comprising, in any given length, a sustaining tension element of the same length as the said given length, a plurality of individually insulated conductors twisted together in a long pitch spiral said conductors being of substantially greater length than said sustaining tension element, the direction of twist of said conductors being reversed at intervals, the length of lay of each complete twist relative to the spacing of the twist reversals being such as to promote separation of the conductors from each other and from the sustaining tension element, a wrapping encircling the sustaining tension element and the conductor assembly for holding the sustaining element and the conductor assembly together as a unit, said wrapping being removable where desired to permit separation of the conductors from each other and from the sustaining tension element in the region of twist reversal with the assembly under longitudinal tension.

3. A composite electric cable assembly comprising, in any given length, a sustaining element of the same length as the said given length, a plurality of individually insulated conductors twisted together in a long pitch spiral, said conductors being of substantially greater length than said sustaining element, the direction of twist of the conductors being reversed at intervals the spacing of which is at least equal to the length of a complete twist to promote separation of the conductors from each other and from the sustaining tension element, and means for holding the sustaining tension element and the conductors together as a unit, said holding means being readily removable to permit separation of the conductor assembly from the sustaining element and separation of the conductors from each other in the region of twist reversal with the assembly under longitudinal tension.

RICHARD C. WALDRON.
THOMAS L. HALL.

REFERENCES CITED

The following references are of record in the file of this patent:

UNITED STATES PATENTS

| Number | Name | Date |
|---|---|---|
| 2,128,410 | Hall | Aug. 30, 1938 |
| 272,792 | Strohm | Feb. 20, 1883 |
| 379,535 | Hewitt | Mar. 13, 1888 |